US009864922B2

(12) United States Patent
Gupta et al.

(10) Patent No.: US 9,864,922 B2
(45) Date of Patent: Jan. 9, 2018

(54) CONTENT AWARE PATTERN STAMP TOOL

(71) Applicant: Adobe Systems Incorporated, San Jose, CA (US)

(72) Inventors: Sourabh Gupta, Uttar Pradesh (IN); Saurabh Gupta, Uttar Pradesh (IN); Ajay Bedi, Utta Pradesh (IN)

(73) Assignee: ADOBE Systems Inc., San Jose, CA (US)

( * ) Notice: Subject to any disclaimer, the term of this patent is extended or adjusted under 35 U.S.C. 154(b) by 0 days.

(21) Appl. No.: 14/850,391

(22) Filed: Sep. 10, 2015

(65) Prior Publication Data
US 2017/0076472 A1    Mar. 16, 2017

(51) Int. Cl.
G06K 9/46      (2006.01)
G06T 11/60     (2006.01)
G06T 7/00      (2017.01)
G06T 7/40      (2017.01)
G06T 15/50     (2011.01)
G06T 15/04     (2011.01)
G06T 11/00     (2006.01)

(52) U.S. Cl.
CPC .............. *G06K 9/46* (2013.01); *G06T 7/0087* (2013.01); *G06T 7/40* (2013.01); *G06T 7/408* (2013.01); *G06T 11/001* (2013.01); *G06T 11/60* (2013.01); *G06T 15/04* (2013.01); *G06T 15/506* (2013.01); *G06T 2207/10024* (2013.01); *G06T 2207/10152* (2013.01); *G06T 2207/20024* (2013.01); *G06T 2210/16* (2013.01); *G06T 2215/12* (2013.01)

(58) Field of Classification Search
CPC ....... G06T 11/40; G06T 15/506; G06T 15/04; G06T 15/80; G06T 11/60; G06T 7/408; G06T 7/0087; G06K 9/46
USPC .......................................... 382/254
See application file for complete search history.

(56) References Cited

U.S. PATENT DOCUMENTS 5,537,638 A * 7/1996 Morita ................ G06T 15/04
345/426
5,990,901 A * 11/1999 Lawton .............. G06T 15/503
345/581

(Continued)

OTHER PUBLICATIONS

Farenzena, et al., "Recovering Intrinsic Images Using an Illumination Invariant Image," Retrieved from the Internet at URL: http://citeseerx.ist.psu.edu/viewdoc/download?doi=10.1.1.149.918&rep=rep1&type=pdf, on Sep. 10, 2015. 4 pages.

Primary Examiner — John Strege
(74) Attorney, Agent, or Firm — Finch & Maloney PLLC

(57) ABSTRACT

A content aware pattern stamping tool that preserves the visual texture of an area within an image when filling the area with a pattern is provided. In one embodiment, the pattern stamping tool analyzes an area to be filled with a pattern to determine textural characteristics of the area. These textural characteristics may include reflectance and shading. Once the pattern stamping tool has determined the textural characteristics of the area, the pattern stamping tool fills the area with the pattern and applies the textural characteristics to the filled area. Through application of the textural characteristics, the pattern stamping tool generates an image that combines the pattern with the original textural characteristics of the area.

17 Claims, 12 Drawing Sheets
(9 of 12 Drawing Sheet(s) Filed in Color)

(56) References Cited

U.S. PATENT DOCUMENTS

| | | | | |
|---|---|---|---|---|
| 7,990,381 B2* | 8/2011 | Lindbloom | ............ | G06T 11/001 345/426 |
| 8,249,365 B1* | 8/2012 | Winnemoeller | ...... | G06T 11/001 382/181 |
| 8,411,990 B1* | 4/2013 | Hadap | ....................... | G06T 7/40 382/154 |
| 2002/0097241 A1* | 7/2002 | McCormack | ........... | G06T 11/40 345/423 |
| 2004/0164996 A1* | 8/2004 | Criminisi | ................. | G06T 11/40 345/619 |
| 2004/0263510 A1* | 12/2004 | Marschner | ............. | G06T 13/40 345/419 |
| 2009/0027391 A1* | 1/2009 | Burley | .................... | G06T 15/04 345/426 |

\* cited by examiner

CONTENT AWARE PATTERN STAMP TOOL

FIELD OF THE DISCLOSURE

This disclosure relates to techniques of editing content, and more particularly, to techniques of modifying images to include additional content.

BACKGROUND

The software industry has developed numerous programs to allow users to generate or edit various types of content. This content may include drawings or other images, video, text, and the like. The programs provide many benefits in generating and editing content. For example, image editing programs enable users to create new images or alter existing images. User initiated changes to these images may include adding shapes, adding text, numbers, or other symbols, and shading, blurring, or filtering features of an image. Some conventional content editing programs include tools that enable a user to designate an area of an image to be filled or "stamped" with a predefined pattern (e.g., such as the pattern stamp tool provided in Adobe® Photoshop®). These predefined patterns may range from simple, solid colors to complex, polychromatic images. When stamping an area with a pattern, conventional programs simply replace the area with the pattern, repeating any portions of the pattern as necessary to overwrite all portions of the designated area.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 4:
FIG. 4 is an input image in accordance with one or more embodiments of the present disclosure.
Figure 12:
FIG. 12 is an output image in accordance with one or more conventional contend editing tools.

Conventional pattern stamping tools provide the ability to make substantial modifications to an image in a short period of time, by filling that area with a selected pattern. However, such tools suffer from disadvantages, depending on the image being modified. For example, images that include idiosyncratic textural elements may not be amenable to modifications that simply replace an area with a pattern, as doing so may yield unrealistic results. FIG. 4 illustrates an example image that is not amenable to conventional pattern stamping. As shown, FIG. 4 includes an area 400. This area 400 depicts a blanket. The area 400 includes shaded regions 402 and reflective regions 404. As can be seen, the shaded regions 402 and the reflective regions 404 contribute to the realistic appearance of the blanket and the figure as a whole. FIG. 12 illustrates an example image that has been processed by a conventional pattern stamping tool. As shown, FIG. 12 includes an area 1200 that corresponds to the area 400. The area 1200 has been filled with a polka dot pattern. As can be seen, the area 1200 is devoid of shade or reflection. This lack of visual texture in the area 1200 results in an unrealistic appearance.

To aid the reader's understanding of various example embodiments disclosed herein, some terminology used to describe these embodiments will now be presented. As referred to herein, a pattern stamp component is a hardware and/or software component configured to fill (e.g., overwrite) a selected area of an image with a pattern. As referred to herein, an area of an image is a subset of the image. Thus, an area may range from a single pixel of an image to all pixels included in the image. As referred to herein, a pattern is set of pixels. Thus a pattern may range from a simple group of monochromatic pixels to a complex polychromatic group of pixels. Some pattern stamp components described herein utilize an illumination map to fill a selected area with a textured pattern. As referred to herein, an illumination map is a set of values descriptive of a texture (e.g., shading and reflectance) within an area of an image. Within some embodiments, the illumination map is used to apply a texture to a pattern. As referred to herein, a textured pattern is a pattern that has been modified to have textural characteristics (e.g., shading and reflectance) of an area of an image.

To address disadvantages of conventional pattern stamping tools, improved pattern stamping techniques are disclosed herein. Unlike existing techniques that blindly fill the object area, the techniques are content-aware in that they consider the underlying properties of the image area on which they are being applied. By considering the intrinsic properties of the target area to be filled, a more realistic resulting texture can be achieved. To this end, some embodiments disclosed herein implement a content aware pattern stamping tool that preserves the visual texture of an area within an image when filling the area with a pattern. For example, in one embodiment, the pattern stamping tool analyzes an area to be filled with a pattern to determine textural characteristics of the area. These textural characteristics may include, for example, reflectance and shading. Reflectance in an image describes how the surfaces depicted in the image reflect light from the source of illumination from the perspective of the camera. A highly reflective surface in the image may appear lighter than its natural chromaticity. Shading in an image results when some amount of light from a source of illumination is prevented from reaching a surface. Shading occurs via interaction between surfaces depicted in the image and the source of illumination for the image and depends on the position and orientation of the surfaces and the source of illumination. For instance, some intervening surfaces may be positioned between the source of illumination and other surfaces. In this situation, the other surfaces may appear darker than their natural chromaticity due to shade created by the intervening surfaces. Together, shading and reflectance contribute substantially to the textural identity of many images. In some embodiments, once the pattern stamping tool has determined the textural characteristics of an area to be filled or otherwise patterned, the pattern stamping tool fills the area with the desired pattern and applies the identified textural characteristics to the filled area. Thus, the pattern stamping tool generates an image that combines the selected pattern with the original textural characteristics of the area.

In accordance with some embodiments of the present disclosure, a pattern stamp component that preserves textural characteristics of images is provided. In some embodiments, the pattern stamp component is implemented by and within a programmable device, which in turn may be part of a larger distributed computing system. For instance, the pattern stamp component may be a part of a content editing program and system that enables users to modify images by changing data descriptive of the images. The editing system may be implemented, for example, as a desktop application locally installed into a computer system (e.g., desktop, laptop, tablet, etc), or in the context of a client-server arrangement where the editing system is offered as part of a cloud-based service accessible from a server to a client computer via a network.

In some embodiments, the pattern stamp component is programmed or otherwise configured to replicate textural characteristics present within an original area of an image to a new area that has been selected for pattern stamping by a user. When executing according to this configuration, the pattern stamp component first identifies an area to be stamped and determines textural characteristics of the area. In some embodiments, the pattern stamp component determines both shading and reflectance characteristics of the area by decomposing the area into two images: a shading image and a reflectance image. The shading image contains the shading of each pixel in the area. The reflectance image contains the reflectance at each pixel in the area. Various embodiments may operate at a variety of resolutions, thus the area and/or the shading and reflectance images may include one or more blocks of pixels or other portions of the input image.

In some embodiments, the pattern stamp tool is programmed or otherwise configured to recover the shading and reflectance images from estimated derivatives of the images. In these embodiments, the pattern stamp component first computes derivatives within the area. This derivative computation may be performed using, for example, a Sobel filter. Next, the pattern stamp component classifies each derivative as being caused by a change in either shading or reflectance. This classification may be performed by determining whether changes between color values of adjacent pixels are proportional. If so, the changes, and their corresponding to the derivatives, are caused by shading. If not, the changes, and their corresponding derivatives may be caused by reflectance. Next, in these embodiments, the pattern stamp component integrates the classified derivatives to determine both the shading and reflectance images.

In some embodiments, the pattern stamp component is programmed or otherwise configured to generate an illumination map based on the shading and reflectance images, to fill the area with the pattern, and to apply the illumination map to the filled area. In some embodiments, the pattern stamp component generates the illumination map by multiplying each pixel of the shading image by a corresponding pixel in the reflectance image. In other embodiments, the pattern stamp component applies the illumination map to the filled area by multiplying each pixel in the filled area by a corresponding pixel in the illumination map.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. References to "an embodiment," "other embodiments," "an example," "some embodiments," "some examples," "an alternate embodiment," "various embodiments," "one embodiment," "at least one embodiment," "another embodiment," "this and other embodiments" or the like are not necessarily mutually exclusive and are intended to indicate that a particular feature, structure, or characteristic described in connection with the embodiment or example may be included in at least one embodiment or example. The appearances of such terms herein are not necessarily all referring to the same embodiment or example. Any embodiment or example disclosed herein may be combined with any other embodiment or example.

Also, the phraseology and terminology used herein is for the purpose of description and should not be regarded as limiting. Any references to examples, embodiments, components, elements, or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

System Architecture

Figure 1:
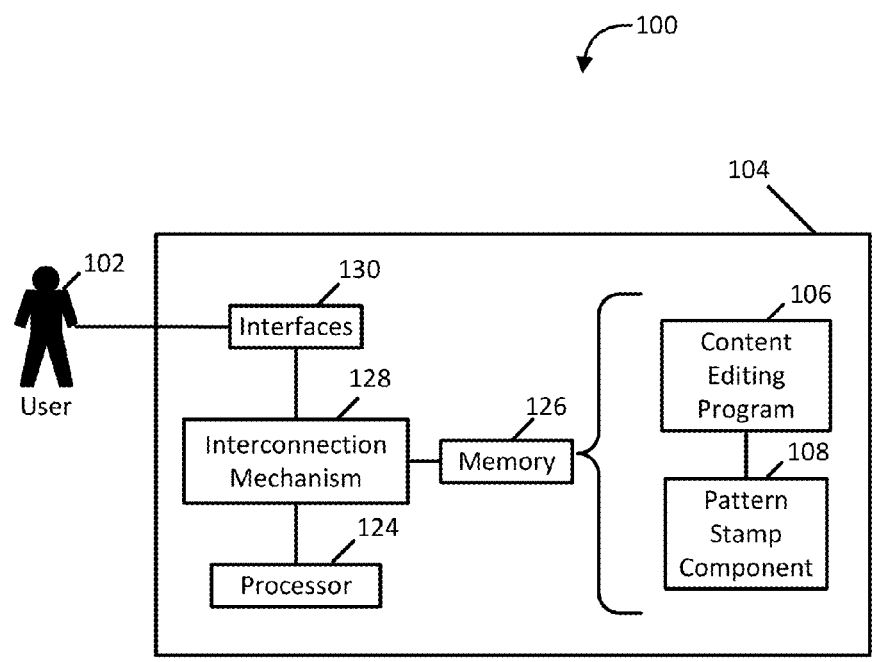
FIG. 1 is a block diagram illustrating an example content editing device in accordance with one or more embodiments of the present disclosure.

Various embodiments disclosed herein implement a pattern stamp component within one or more programmable devices. These programmable devices may include any device that processes information. Examples of common programmable devices include personal computers, workstations, servers, cellular telephones, and personal digital assistants. FIG. 1 illustrates one example in accord with some of the embodiments disclosed herein, a content editing device 100. As shown in FIG. 1, the content editing device 100 includes a processor 124, a memory 126, an interconnection mechanism 128, one or more interfaces 130, a content editing program 106, and a pattern stamp component 108.

As illustrated in FIG. 1, the content editing device 100 includes a suite of components that are standard for a programmable device. These components are the processor 124, the memory 126, the interconnection mechanism 128, and the interfaces 130. The particular manufacturer and model of any standard component may vary between the embodiments disclosed herein.

The interfaces 130 include one or more physical interface devices such as input devices, output devices, and combination input/output devices and a software stack configured to drive operation of the devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, accelerometers, network interface cards, etc. Interface devices allow programmable devices to exchange information and to communicate with external entities, such as users and other systems.

The interconnection mechanism 128 is a communication coupling between the processor 124, the memory 126, and the interfaces 130. The interconnection mechanism 128 may include one or more physical busses in conformance with specialized or standard computing bus technologies such as IDE, SCSI, PCI, and InfiniBand. The interconnection mechanism 128 enables communications, including instructions and data, to be exchanged between the processor 124, the memory 126, and the interfaces 130.

The memory 126 includes readable and/or writeable data storage that stores programs and data used or manipulated during operation of a programmable device. The programs stored in the memory 126 are a series of instructions that are executable by the processor 124. The memory 126 may include relatively high performance data storage, such as registers, caches, dynamic random access memory, and static memory. The memory 126 may further include a relatively low performance, non-volatile data storage medium such as flash memory or an optical or magnetic disk. Various embodiments may organize the memory 126 into particularized and, in some cases, unique structures to store data in support of the components disclosed herein. These data structures may be specifically configured to conserve storage space or increase data exchange performance and may be sized and organized to store values for particular data and types of data.

To implement specialized components of some embodiments, the processor 124 executes a series of instructions (i.e., one or more programs) that result in manipulated data. The processor 124 may be any type of processor, multiprocessor, microprocessor, or controller known in the art. The processor 124 is connected to and communicates data with the memory 126 and the interfaces 130 via the interconnection mechanism 128. In operation, the processor 124 causes data to be read from a non-volatile (i.e., non-transitory) data storage medium in the memory 126 and written to high performance data storage. The processor 124 manipulates the data within the high performance data storage, and copies the manipulated data to the data storage medium after processing is completed.

In addition to the standard suite of components described above, the content editing device 100 includes customized components. For example, as shown in FIG. 1, these customized components include the content editing program 106 and the pattern stamp component 108.

Figure 2:
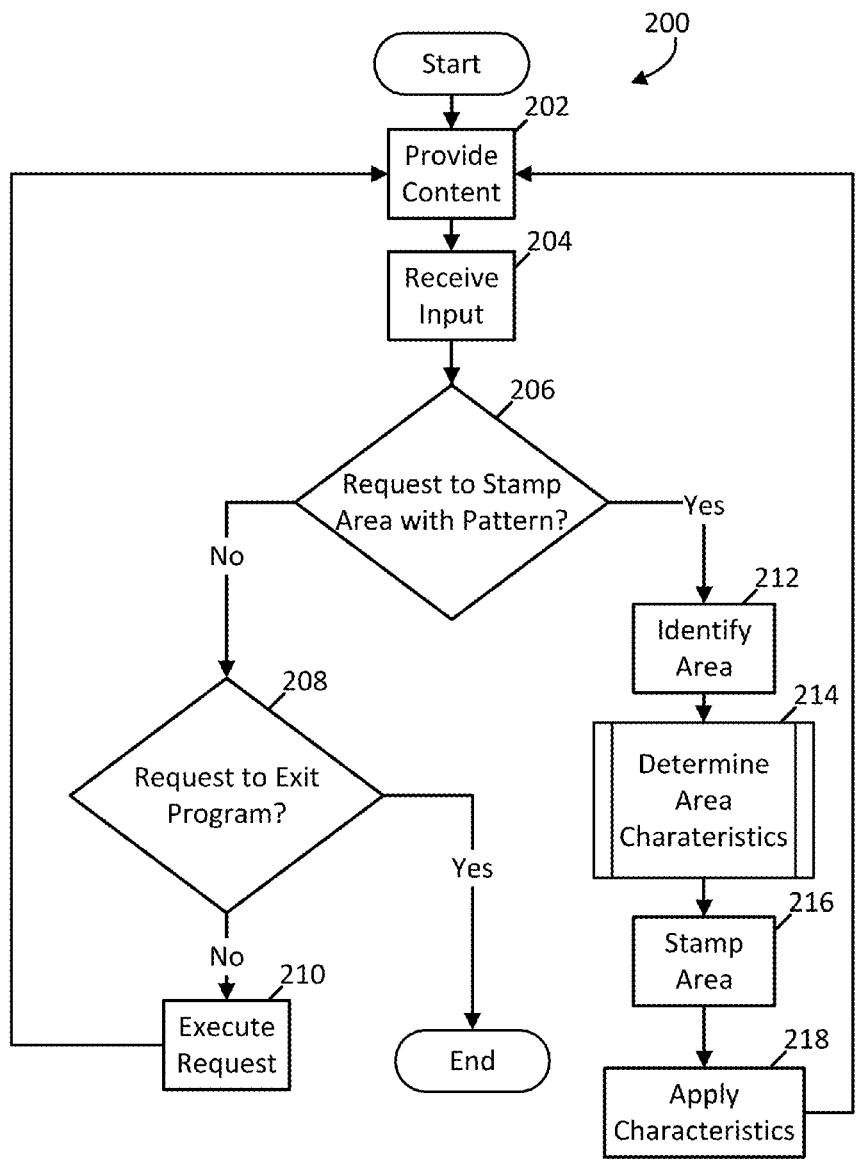
FIG. 2 is a flowchart illustrating an example content editing process in accordance with one or more embodiments of the present disclosure.

In some embodiments, the processor 124 is configured to implement the content editing program 106. The content editing program 106 may be any of a variety of different computer programs, such as applications, operating system components, and so forth. In some embodiments, the content editing program 106 is an image editing program configured to capture, edit, or otherwise manipulate data descriptive of one or more images. The content editing program 106 may alternatively be other types of programs, such as a video editing program configured to capture, edit, or otherwise manipulate data descriptive of video (e.g., multiple image frames). When executing according to its configuration, the content editing program 106 receives user input that identifies various actions to be executed on the data such as by adding to the data, removing parts of the data, modifying parts of the data, and so forth. In this way, lines, patterns, or shapes may be added, opacity of images may be increased or decreased, colors may be changed, various other filters may be applied to change the appearance of images, and so forth. The particular actions that may be executed vary based on the particular content editing program 106. In at least one embodiment, when executing in accordance with its configuration, the content editing program 106 executes a content editing process, such as the content editing process 200 described further below with reference to FIG. 2.

Figure 3:
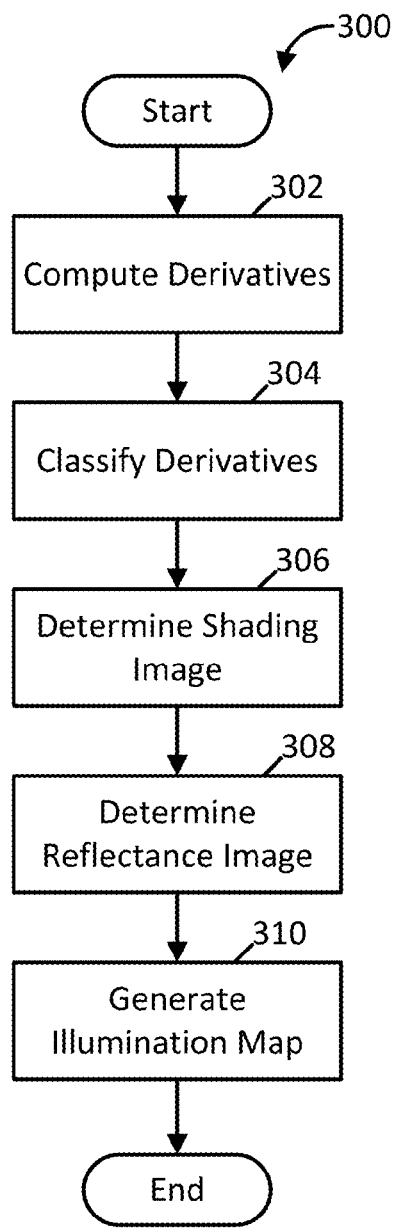
FIG. 3 is a flowchart illustrating an example texture determination process in accordance with one or more embodiments of the present disclosure.

In some embodiments, the content editing program 106 is configured to initiate execution of the pattern stamp component 108 in response to receiving user input requesting an area of an image be filled with a selected pattern. In some embodiments, the pattern stamp component 108 is configured to determine textural characteristics of the area, stamp the area with the pattern, and apply the characteristics to the stamped area. In at least one embodiment, when executing according to its configuration, the pattern stamp component 108 executes a pattern stamping process described further below with reference to FIGS. 3 and 4.

In some embodiments, the components disclosed herein may create, read, update, and delete parameters that affect the functions performed by the components. These parameters may be physically stored in any form of suitable memory including volatile memory or non-volatile memory. In addition, the parameters may be logically stored in a propriety data structure (such as a database or file defined by a user space application) or in a commonly shared data structure (such as an application registry that is defined by an operating system). In addition, some examples provide for both system and user interface components that allow external entities to modify the parameters and thereby configure the behavior of the components.

Although an embodiment implementing particular functionality is discussed herein with reference to particular components, it should be noted that, in other embodiments, the functionality of individual components can be separated into multiple components, and/or at least some functionality of multiple components can be combined into a single component. Information may flow between the any of the components described herein using a variety of techniques. Such techniques include, for example, passing the information over a network using standard protocols, such as TCP/IP or HTTP or HTTPS, and passing the information between components via data structures written in shared volatile or non-volatile memory. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Although the content editing device 100 is shown by way of example as a type of programmable device capable of executing the processes disclosed herein, embodiments are not limited to being implemented on the programmable devices shown in FIG. 1. Various processes may be practiced on one or more programmable devices having a different architectures or components than those shown in FIG. 1. For instance, a programmable device may include specially programmed, special-purpose hardware, such as an application-specific integrated circuit (ASIC), a field-programmable gate array (FPGA), a complex programmable logic device (CPLD), and other implementations in silicon or other hardware tailored to execute processes disclosed herein. Thus, components of a programmable device as disclosed herein may be implemented in software, hardware, firmware, or any combination thereof.

As described above, some embodiments execute content editing processes. For example, in at least one embodiment, the content editing device 100 implements the content editing program 106 which, in turn, executes a content editing process 200 illustrated in FIG. 2.

The content editing process 200 begins with act 202 where the content editing program provides content to a user. This content may include, for example, an image (e.g., the image of FIG. 4) provided via a user interface (e.g., within the interfaces 130). In act 204, the content editing program receives user input via the user interface. The user input may specify a request to act upon the content. In act 206, the content editing program parses the input and determines whether the input specifies a request to stamp an area of the image with a pattern. If the input specifies such a stamping request, the content editing program implements a pattern stamp component (e.g., the pattern stamp component 108) which, in turn, executes act 212. If the input does not specify a stamping request, the content editing program executes act 208.

In the act 208, the content editing program determines whether the input specifies a request to exit the content editing program. If the input specifies a request to exit the content editing program, the content editing program terminates the content editing process 200. If the input does not specify a request to exit the program, the content editing program executes act 210. In the act 210, the content editing program executes an action specified by the input.

In the act 212, the pattern stamp component identifies an area to stamp by parsing the stamping request specified by the input. In act 214, the pattern stamping component determines textural characteristics of the area. One example of an texture determination process 300 executed by the pattern stamp component in the act 212 is described further below with reference to FIG. 3. In act 216, the pattern stamp component fills the area with the pattern.

In act 218, the pattern stamp component applies the determined textural characteristics to the stamped area. In one embodiment, the pattern stamp component applies the textural characteristics by multiplying the RGB values of each pixel within the stamped area by a corresponding entry within an illumination map. This illumination map is described further below with reference to FIGS. 3 and 10.

As described above, some embodiments execute texture determination processes. For example, in at least one embodiment, the content editing device 100 implements the pattern stamp component 108 which, in turn, executes an texture determination process 300 illustrated in FIG. 3.

The texture determination process 300 begins with act 302 where a pattern stamp component (e.g., the pattern stamp component 108) computes x and y derivatives of the area of the image. In at least one embodiment, the pattern stamp component computes the x and y derivatives by applying a filter, such as a Sobel filter, to data descriptive of the image.

In act 304, the pattern stamp component classifies each of the x and y derivatives as measuring a change in either shading or reflectance. To perform this classification in at least one embodiment, the pattern stamp component first allocates a three-dimensional vector for each pixel in the area and populates each vector with the RBG value triplets of a pixel. Next, the pattern stamp component normalizes the vectors and computes a dot product of each pair of pixels that are horizontally or vertically adjacent. Finally, the pattern stamp component compares the value of the dot products to configurable ranges of tolerance. Where the value of the dot product falls inside a first configurable range of tolerance, the x or y derivative corresponding to the dot product is classified as a reflectance derivative. In one embodiment, the first configurable range is [0.5, 0.8]. Where the value of the dot product falls inside a second configurable range of tolerance, the x or y derivative corresponding to the dot product is classified as a shading derivative. In one embodiment, the second configurable range is [0.95, 1]. Where the value of the dot product falls outside the first and second configurable ranges of tolerance, the dot product classification method is inconclusive. For non-conclusive classifications, the pattern stamp tool propagates classifications from conclusive image pixels to inconclusive image pixels using a standard method (e.g., Markov Random Field). When executing a Markov Random Field method, the pattern stamp tool propagates a classification along pixels that are located within a contour in the image. In this way, the act 304 classifies each derivative into either a shading derivative or a reflectance derivative.

In act 306, the pattern stamp component recovers the shading image by integrating the shading derivatives. For example, in one embodiment, the pattern stamp component determines each pixel S(x, y) of the shading image using the following Equation 1.

$$S(x,y)=g*[(fx(-x,-y)*Fx)+(fy(-x,-y)*Fy)] \qquad \text{Equation 1}$$

In Equation 1, Fx and Fy are estimated shading derivatives identified in the act 304, fx( ) and fy( ) are filters (e.g., a Sobel filter) that generate x and y derivatives, "*" indicates the convolution operation, f(−x, −y) is a reversed copy of f(x, y), and g is the solution of the following Equation 2.

$$g*[(fx(-x,-y)*fx(x,y))+(fy(-x,-y)*fy(x,y))]=\delta \qquad \text{Equation 2}$$

In Equation 2, g*[(fx(−x, −y)*fx(x, y))+(fy(−x, −y)*fy(x, y))] will be minimized as δ tends to zero.

In act 308, the pattern stamp component constructs the reflectance image by integrating the reflectance derivatives. For example, in one embodiment, the pattern stamp component determines each pixel R(x, y) of the reflectance image using the following Equation 3.

$$R(x,y)=g*[(fx(-x,-y)*Fx)+(fy(-x,-y)*Fy)] \qquad \text{Equation 3}$$

In Equation 3, Fx and Fy are estimated reflectance derivatives identified in the act 304, fx( ) and fy( ) are filters (e.g., a Sobel filter) that generate x and y derivatives, "*" indicates the convolution operation, f(−x, −y) is a reversed copy of f(x, y), and g is the solution of the Equation 2 described above.

In act 310, the pattern stamp component generates an illumination map from the shading image and the reflectance image. For example, in one embodiment, the pattern stamp component determines each pixel, I(x, y), of the illumination map using the following Equation 4.

$$I(x,y)=R(x,y)*S(x,y) \qquad \text{Equation 4}$$

In Equation 4, "*" indicates the multiplication operation. In some embodiments, the pattern stamp component normalizes each pixel, I(x, y), of the illumination map using the following Equation 5.

$$I(x,y)=[R(x,y)*S(x,y)]/255 \qquad \text{Equation 5}$$

In Equation 5, "*" indicates the multiplication operation.

Processes in accord with the texture determination process 300 enable pattern stamp components to generate an illumination map. This illumination map may be applied to a new pattern to generate a realistic rendition of an area that combines the characteristics of the area with the new pattern.

A particular example in accord with various embodiments will now be described with reference to FIGS. 4-11. FIGS. 4-11 illustrate images that are processed during execution of a content editing process (e.g. the content editing process 200) by a content editing device (e.g., the content editing device 100).

According to this example, a user (e.g., the user 106) enters input that specifies a request to edit the image illustrated in FIG. 4. In response to receiving this input, the content editing device parses the input, executes a content editing program (e.g., the content editing program 106), and passes an identifier of the image illustrated in FIG. 4 to the content editing program.

In this example, the content editing program executes the act 202 to provide the image illustrated in FIG. 4 to the user via a user interface (e.g., within the interfaces 130). The content editing program executes the act 204 to receive input from the user that specifies a request to stamp the area 400 with a pattern. The content editing program executes the act 206 to parse the input and identify the request as a stamping request. The content editing program also initiates, during execution of the act 206, a pattern stamp component (e.g., the pattern stamp component 108) in response to identifying the request as a stamping request.

Continuing this example, the pattern stamp component executes the act 212 to identify the area selected for stamping. The pattern stamp component executes the act 214 to determine the textural characteristics of the selected area. Within the act 214, the pattern stamp component executes a texture determination process (e.g., the texture determination process 300).

Figure 5:
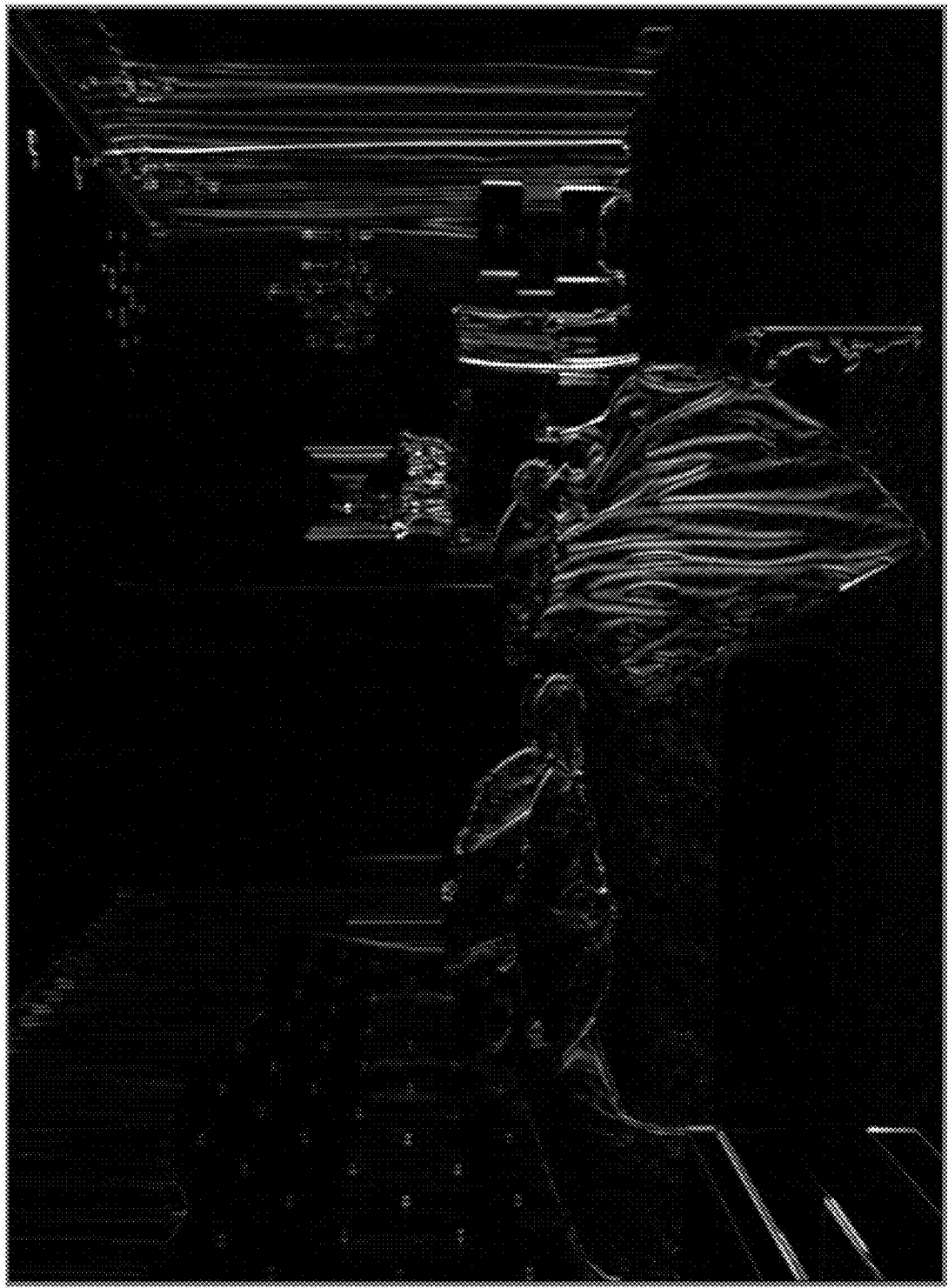
FIG. 5 is an x gradient image in accordance with one or more embodiments of the present disclosure.
Figure 6:
FIG. 6 is a y gradient image in accordance with one or more embodiments of the present disclosure.
Figure 7:
FIG. 7 is a total gradient image in accordance with one or more embodiments of the present disclosure.
Figure 8:
FIG. 8 is a shading image in accordance with one or more embodiments of the present disclosure.
Figure 9:
FIG. 9 is a reflectance image in accordance with one or more embodiments of the present disclosure.
Figure 10:
FIG. 10 is an image representation of an illumination map in accordance with one or more embodiments of the present disclosure.

Next, the pattern stamp component executes the act 302 to compute the x and y derivatives of the area 400. FIG. 5 graphically illustrates the x derivatives. FIG. 6 graphically illustrates the y derivatives. FIG. 7 graphically illustrates the combination of the x and y derivatives. The pattern stamp component executes the act 304 to classify each of the x and y derivatives as either a shading derivative or a reflectance derivative. The pattern stamp component executes the act 306 to determine a shading image of the selected area by integrating the shading derivatives. FIG. 8 illustrates the shading image. The pattern stamp component executes the act 308 to determine a reflectance image of the selected area by integrating the reflectance derivatives. FIG. 9 illustrates the reflectance image. The pattern stamp component executes the act 310 to generate an illumination map by combining the shading image and the reflectance image into a normalized, grayscale image. FIG. 10 graphically illustrates the illumination map.

Figure 11:
FIG. 11 is an output image in accordance with one or more embodiments of the present disclosure.

Continuing this example, the pattern stamp component executes the act 216 to fill the area with the pattern. The pattern stamp component executes the act 218 to apply the illumination map to the pattern by multiplying each pixel in the area by its corresponding normalized grayscale value in the illumination map. FIG. 11 illustrates the output image provided by the content editing program after execution of the act 202 following execution of the act 218.

Each of the processes described herein depict one particular sequence of acts in a particular example. The acts included in these processes may be performed by, or using, one or more programmable devices specially configured as discussed herein. Some acts are optional and, as such, may be omitted in accord with one or more examples. Additionally, the order of acts can be altered, or other acts can be added, without departing from the scope of the embodiments discussed herein. Furthermore, as discussed above, in at least one example, the acts are performed on a particular, specially configured machine, namely a content editing device configured according to the examples and embodiments disclosed herein.

Further Example Embodiments

According to one embodiment, a content editing device is provided. The content editing device includes memory storing image data descriptive of an image, at least one processor coupled to the memory, and a pattern stamp component executable by the at least one processor. The pattern stamp component is configured to generate an illumination map descriptive of a texture within an area of the image, fill the area with a pattern, and apply the illumination map to the area to generate a textured pattern within the area.

In the content editing device, the illumination map may be descriptive of shading and reflectance at each pixel within the area. The illumination map may include a grayscale value corresponding to each pixel within the area. The area may be described by a subset of the image data. The pattern stamp component may be configured to apply the illumination map at least in part by multiplying one or more values descriptive of each pixel in the area with a corresponding value in the illumination map.

In the content editing device, the pattern stamp component may be configured to generate the illumination map at least in part by being configured to compute derivatives of the area, classify each derivative as either a shading derivative or a reflectance derivative, integrate derivatives classified as shading derivatives into a shading image, integrate derivatives classified as reflectance derivatives into a reflectance image, and multiply at least one value of each pixel of the shading image by at least one value of each pixel of the reflectance image to generate at least one value of each pixel of the illumination map. The pattern stamp component may be configured to classify each derivative at least in part by being configured to identify a first pixel within the area, the first pixel corresponding to the derivative being classified; identify a second pixel within the area, the second pixel corresponding to the derivative being classified; generate a first vector for the first pixel, the first vector including one or more values descriptive of the first pixel; generate a second vector for the second pixel, the second vector including one or more values descriptive of the second pixel; calculate a dot product value of the first vector and the second vector; classify the derivative as a reflectance derivative where the dot product value is within a first range of values; classify the derivative as a shading derivative where the dot product value is within a second range of values; and classify the derivative as an inconclusive derivative where the dot product value is outside of the second range of values and the first range of values.

According to another embodiment, a method of editing content using a content editing device is provided. The content editing device includes memory and at least one processor. The method comprises acts of generating an illumination map descriptive of a texture within an area of an image, filling the area with a pattern, and applying the illumination map to the area to generate a textured pattern within the area.

In the method, the act of generating the illumination map may include an act of generating an illumination map descriptive of shading and reflectance at each pixel within the area. The act of generating the illumination map may include an act of generating an illumination map including a grayscale value corresponding to each pixel within the area. The act of filling the area may include an act of overwriting a subset of the image data. The act of applying the illumination map may include an act of multiplying one or more values descriptive of each pixel in the area with a corresponding value in the illumination map.

In the method, the act of generating the illumination map may include acts of computing derivatives of the area, classifying each derivative as either a shading derivative or a reflectance derivative, integrating derivatives classified as shading derivatives into a shading image, integrating derivatives classified as reflectance derivatives into a reflectance image, and multiplying at least one value of each pixel of the shading image by at least one value of each pixel of the reflectance image to generate at least one value of each pixel of the illumination map. The act of classifying each derivative may include acts of identifying a first pixel within the area, the first pixel corresponding to the derivative being classified; identifying a second pixel within the area, the second pixel corresponding to the derivative being classified; generating a first vector for the first pixel, the first vector including one or more values descriptive of the first pixel; generating a second vector for the second pixel, the second vector including one or more values descriptive of the second pixel; calculating a dot product value of the first vector and the second vector; classifying the derivative as a reflectance derivative where the dot product value is within a first range of values; classifying the derivative as a shading derivative where the dot product value is within a second range of values; and classifying the derivative as an inconclusive derivative where the dot product value is outside of the second range of values and the first range of values.

According to another embodiment, a non-transitory data storage medium is provided. The medium stores instructions executable by a programmable device. The instructions are configured to execute a method of editing content. The method comprising acts of generating an illumination map descriptive of a texture within an area of an image, filling the area with a pattern, and applying the illumination map to the area to generate a textured pattern within the area.

In the method the instructions are configured to execute, the act of generating the illumination map may include an act of generating an illumination map descriptive of shading and reflectance at each pixel within the area. The act of generating the illumination map may include an act of generating an illumination map including a grayscale value corresponding to each pixel within the area. The act of filling the area may include an act of overwriting a subset of the image data. The act of applying the illumination map may include an act of multiplying one or more values descriptive of each pixel in the area with a corresponding value in the illumination map.

In the method the instructions are configured to execute, the act of generating the illumination map may include computing derivatives of the area; classifying each derivative as either a shading derivative or a reflectance derivative; integrating derivatives classified as shading derivatives into a shading image; integrating derivatives classified as reflectance derivatives into a reflectance image; and multiplying at least one value of each pixel of the shading image by at least one value of each pixel of the reflectance image to generate at least one value of each pixel of the illumination map

Having thus described several aspects of at least one embodiment, it is to be appreciated that various alterations, modifications, and improvements will readily occur to those skilled in the art. For instance, embodiments disclosed herein may also be used in other contexts wherein the recordings include both audio and video data. Such alterations, modifications, and improvements are intended to be part of this disclosure, and are intended to be within the scope of the embodiments discussed herein. Accordingly, the foregoing description and drawings are by way of example only.

What is claimed is:

1. A content editing device comprising:
memory storing image data descriptive of an image;
at least one processor coupled to the memory; and
a pattern stamp component executable by the at least one processor and configured to:
generate an illumination map descriptive of a texture within an area of the image at least in part by being configured to:
compute derivatives of the area;
classify each derivative as either a shading derivative or a reflectance derivative;
integrate derivatives classified as shading derivatives into a shading image;
integrate derivatives classified as reflectance derivatives into a reflectance image; and
multiply at least one value of each pixel of the shading image by at least one value of each pixel of the reflectance image to generate at least one value of each pixel of the illumination map;
fill the area with a pattern; and
apply the illumination map to the area to generate a textured pattern within the area.

2. The device of claim 1, wherein the illumination map is descriptive of shading and reflectance at each pixel within the area.

3. The device of claim 1, wherein the illumination map includes a grayscale value corresponding to each pixel within the area.

4. The device of claim 1, wherein the area is described by a subset of the image data.

5. The device of claim 1, wherein the pattern stamp component is configured to apply the illumination map at least in part by multiplying one or more values descriptive of each pixel in the area with a corresponding value in the illumination map.

6. The device of claim 1, wherein the pattern stamp component is configured to classify each derivative at least in part by being configured to:
identify a first pixel within the area, the first pixel corresponding to the derivative being classified;
identify a second pixel within the area, the second pixel corresponding to the derivative being classified;
generate a first vector for the first pixel, the first vector including one or more values descriptive of the first pixel;
generate a second vector for the second pixel, the second vector including one or more values descriptive of the second pixel;
calculate a dot product value of the first vector and the second vector;
classify the derivative as a reflectance derivative where the dot product value is within a first range of values;
classify the derivative as a shading derivative where the dot product value is within a second range of values; and
classify the derivative as an inconclusive derivative where the dot product value is outside of the second range of values and the first range of values.

7. A method of editing content using a content editing device including memory and at least one processor, the method comprising:

generating an illumination map descriptive of a texture within an area of an image at least in part by:
  computing derivatives of the area;
  classifying each derivative as either a shading derivative or a reflectance derivative;
  integrating derivatives classified as shading derivatives into a shading image;
  integrating derivatives classified as reflectance derivatives into a reflectance image; and
  multiplying at least one value of each pixel of the shading image by at least one value of each pixel of the reflectance image to generate at least one value of each pixel of the illumination map;
filling the area with a pattern; and
applying the illumination map to the area to generate a textured pattern within the area.

8. The method of claim 7, wherein generating the illumination map includes generating an illumination map descriptive of shading and reflectance at each pixel within the area.

9. The method of claim 7, wherein generating the illumination map includes generating an illumination map including a grayscale value corresponding to each pixel within the area.

10. The method of claim 7, wherein filling the area includes overwriting a subset of the image.

11. The method of claim 7, wherein applying the illumination map includes multiplying one or more values descriptive of each pixel in the area with a corresponding value in the illumination map.

12. The method of claim 7, wherein classifying each derivative includes:
  identifying a first pixel within the area, the first pixel corresponding to the derivative being classified;
  identifying a second pixel within the area, the second pixel corresponding to the derivative being classified;
  generating a first vector for the first pixel, the first vector including one or more values descriptive of the first pixel;
  generating a second vector for the second pixel, the second vector including one or more values descriptive of the second pixel;
  calculating a dot product value of the first vector and the second vector;
  classifying the derivative as a reflectance derivative where the dot product value is within a first range of values;
  classifying the derivative as a shading derivative where the dot product value is within a second range of values; and
  classifying the derivative as an inconclusive derivative where the dot product value is outside of the second range of values and the first range of values.

13. A non-transitory data storage medium storing instructions executable by a programmable device, the instructions being configured to execute a method of editing content, the method comprising:
  generating an illumination map descriptive of a texture within an area of an image at least in part by:
    computing derivatives of the area;
    classifying each derivative as either a shading derivative or a reflectance derivative;
    integrating derivatives classified as shading derivatives into a shading image;
    integrating derivatives classified as reflectance derivatives into a reflectance image; and
    multiplying at least one value of each pixel of the shading image by at least one value of each pixel of the reflectance image to generate at least one value of each pixel of the illumination map;
  filling the area with a pattern; and
  applying the illumination map to the area to generate a textured pattern within the area.

14. The data storage medium of claim 13, wherein generating the illumination map includes generating an illumination map descriptive of shading and reflectance at each pixel within the area.

15. The data storage medium of claim 13, wherein generating the illumination map includes generating an illumination map including a grayscale value corresponding to each pixel within the area.

16. The data storage medium of claim 13, wherein filling the area includes overwriting a subset of the image.

17. The data storage medium of claim 13, wherein applying the illumination map includes multiplying one or more values descriptive of each pixel in the area with a corresponding value in the illumination map.

* * * * *